Feb. 3, 1953
G. H. TABER
2,627,123
GAUGE FOR INDICATING CAMBER, CASTER, AND SIDE INCLINATION OF WHEELS
Filed March 6, 1951
2 SHEETS—SHEET 2
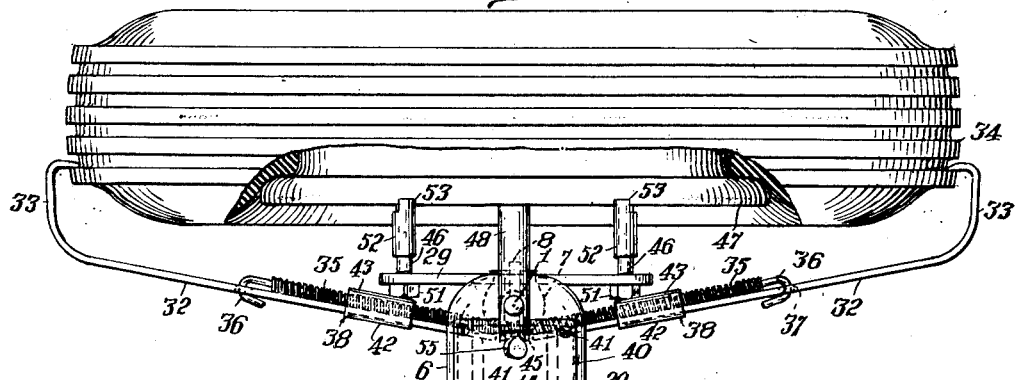
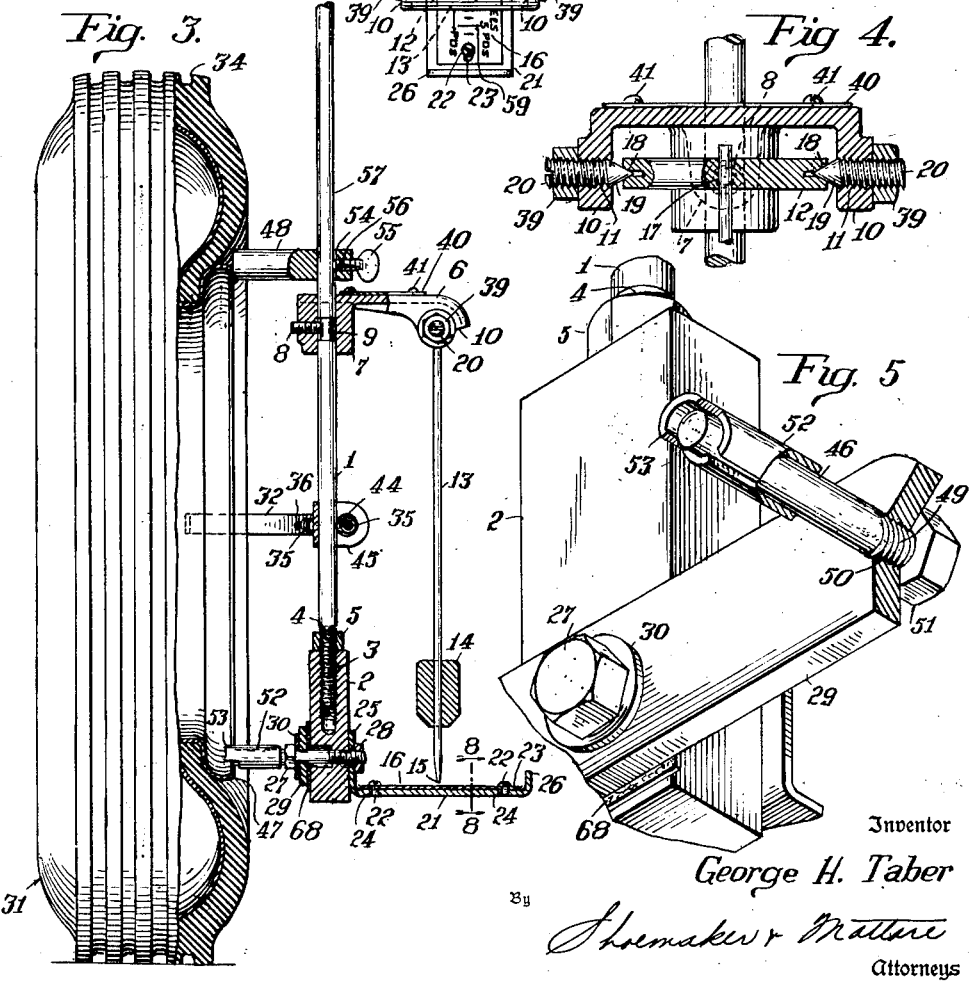
Inventor
George H. Taber
By Shoemaker & Mattare
Attorneys Patented Feb. 3, 1953

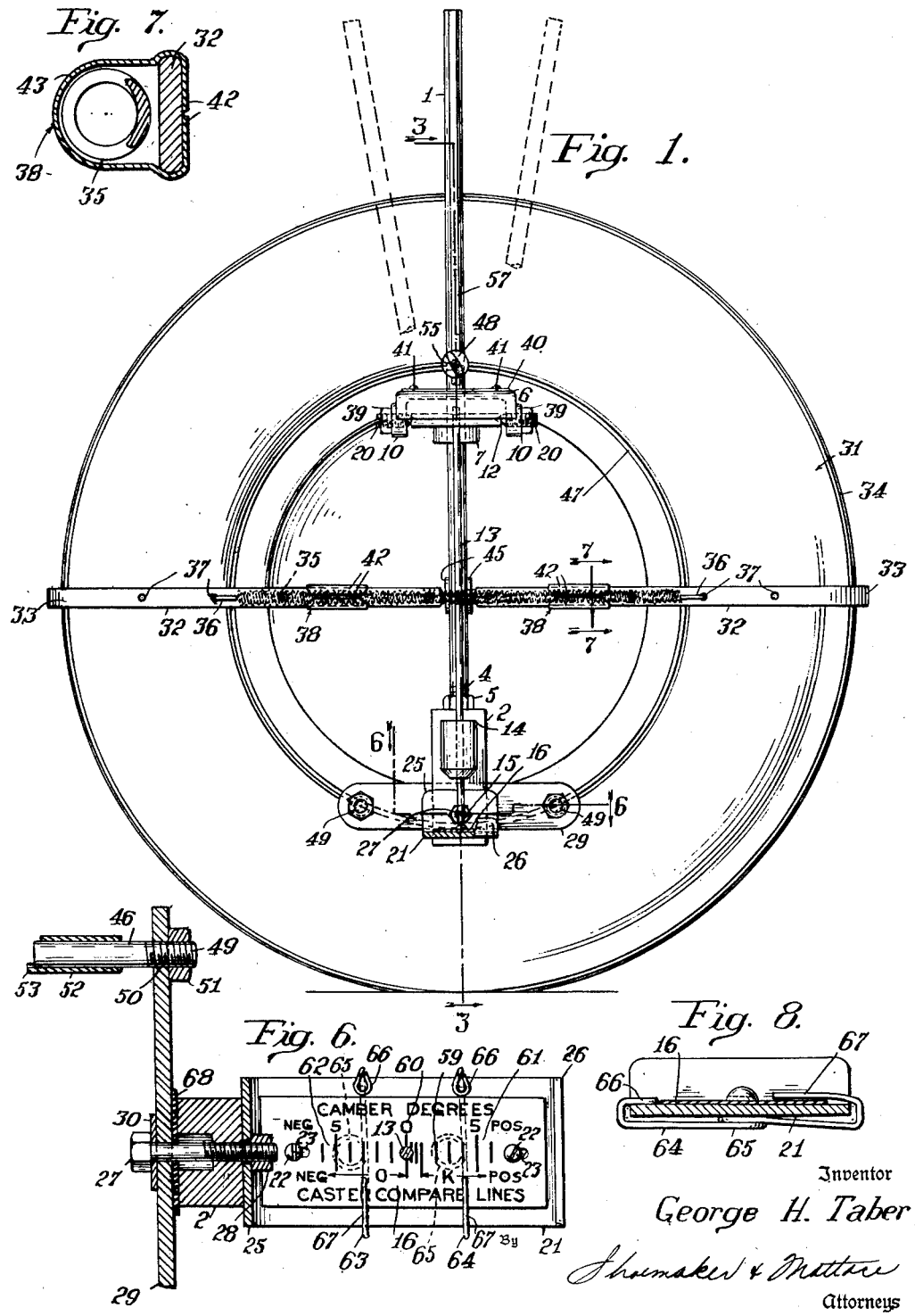

2,627,123

UNITED STATES PATENT OFFICE 2,627,123

GAUGE FOR INDICATING CAMBER, CASTER, AND SIDE INCLINATION OF WHEELS

George H. Taber, Elmira, N. Y.

Application March 6, 1951, Serial No. 214,114

13 Claims. (Cl. 33—203.18)

This invention relates to a gauge for indicating wheel camber by actual degrees and for comparing results of tests pertaining to caster and side-inclination angles of automotive steering spindle bolts.

An object of the present invention is to provide a simple, practical and comparatively inexpensive wheel gauge of strong and durable construction adapted to be easily and quickly applied to the side of a wheel and capable of securely gripping the same and provided with a four-point connection or engagement with the wheel whereby the gauge is maintained in a vertical position in parallelism with the side of the wheel.

A further object of the invention is to provide a wheel gauge of this character which will be capable of adjustment to fit wheels of different diameters and also of adjustment with respect to the wheel for positioning the gauge in a vertical position and with the plumb bob pointer with which the gauge is equipped in proper position with relation to a combination or composite scale for indicating wheel camber by degrees and for comparing test results due to the combination of caster and side-inclination angles of the steering spindle bolts.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a front elevation of a wheel gauge constructed in accordance with this invention and shown applied to a wheel, the scale supporting plate being broken away and sectioned to show the scale plate;

Fig. 2 is a plan view of the same, the upper portion of the wheel being broken away to illustrate the arrangement of the upper and lower rim engaging abutment arms;

Fig. 3 is a central vertical sectional view, the outer portion of the arm which supports the plumb bob pointer being shown in elevation;

Fig. 4 is a detail sectional view taken on the line 4—4 of Fig. 2;

Fig. 5 is an enlarged detail perspective view, partly in section, of the lower block section of the vertical support and one end portion of the horizontal bar which mounts the lower rim engaging abutment arms;

Fig. 6 is an enlarged detail horizontal sectional view taken on the line 6—6 of Fig. 1;

Fig. 7 is a detail sectional view taken on the line 7—7 of Fig. 1 to illustrate the construction of the sleeves of the clamping bars;

Fig. 8 is a detail sectional view on the line 8—8 of Fig. 3, showing the construction of the markers.

In the accompanying drawings in which is illustrated one embodiment of the invention, the wheel gauge comprises in its construction a central vertical support consisting of a round rod 1 and a block 2 forming the lower section or portion of the vertical support and having vertical side, front and rear faces, and provided in its upper portion with a threaded socket 3 which is engaged by the lower threaded terminal portion 4 of the rod 1. The threaded connection of the lower end of the rod 1 with the block provides for a vertical adjustment of the rod which is secured in such adjustment by a jam nut 5 arranged on the threaded portion of the rod and engaging the upper end of the block.

The vertical rod 1 has adjustably mounted on it a horizontal plumb bob supporting arm 6 preferably consisting of a casting and provided at its inner end with a depending vertically arranged sleeve 7 fitting the vertical rod and secured in its adjustment thereon by an Allen set screw 8. The rod is preferably provided with a reduced portion 9 of a length less than the sleeve and against which the Allen set screw is jammed. The supporting arm 6 is provided at its outer portion with spaced side flanges 10 having aligned threaded openings 11 for the reception of cone bearing screws 20 for mounting a transverse spindle 12 from which is suspended a plumb bob pointer 13 provided at its lower portion with a weight 14 and having its lower terminal portion tapered to a point 15 and movable over a scale plate 16. The plumb bob pointer consists of a rod and the said weight 14 and the upper end of the plumb bob rod extends through a central aperture 17 of the transverse spindle 12 and is suitably secured to the latter with its lower pointed terminal contiguous to the scale plate 16 and slightly spaced therefrom so as to move over the scale plate closely adjacent the markings thereof. The upper end of the plumb bob rod may be secured in the central opening of the spindle 12 by a press fit or any other suitable means and the transverse spindle 12 is provided at its ends with bearing recesses 18 which receive the conical inner ends 19 of the screws 20 which are adapted to be adjusted to provide the minimum amount of friction for allowing the swingable movement of the plumb bob pointer so that the latter will, under the influence of gravity, descend to the "at rest," lowermost point of its swing travel with relation to the graduated scale. The screws are secured in their adjustment by jam nuts 39 arranged on the outer threaded portions of the screws and engaging the outer faces of the flanges 10. The arm 6 also provides a convenient means for supporting a name plate 40 secured by screws 41 or other suitable means to the upper face of the arm 6.

The scale plate is adjustably secured to a horizontal supporting plate 21 by clamping screws 22 extending through longitudinal slots 23 in the scale plate and having a threaded engagement with openings 24 in the supporting plate. The supporting plate 21 is provided with inner and outer vertical flanges 25 and 26 spaced from the ends of the scale plate a sufficient distance to provide for an adjustment of the scale plate to bring the center thereof directly beneath the tapered end 15 of the plumb bob pointer when the rod 1 is in a vertical position and the plumb bob pointer is vertical and in parallelism with the rod 1. The outer flange 26 extends upwardly from the supporting plate 21 a sufficient distance to limit the outward swing of the plumb bob pointer and the inner vertical flange 25 which is fitted flat against the front face of the block 2 is secured to the same by a bolt 27 piercing and having threaded engagement with the lower portion of the block 2 and provided at its inner end with a head and engaged at its outer end by a nut 28 which engages the front face of the flange 25 and securely clamps the same to the front face of the block 2. The bolt 27 also secures a horizontal supporting bar 29 to the rear face of the block 2, a washer 30 being preferably interposed between the head of the bolt and the rear face of the bar 29.

The gauge is detachably mounted on a wheel 31 by means of a pair of horizontally disposed clamping bars 32 provided at their outer ends with claws or hooks 33 which engage the tire 34 of the wheel at the front and rear portions thereof and at points diametrically opposite each other and centrally of the wheel. The clamping bars are yieldably maintained in engagement with the tire by means of a coil spring 35 extending along the inner portions of the clamping bars 32 at the inner faces thereof and provided with terminal hooks 36 which engage perforations 37 disposed at spaced points along the clamping bars to provide for a tensioning of the spring. The clamping bars are provided at their inner portions with sleeves 38 through which the coil spring passes and which support the coil spring in its position longitudinally of the clamping bars. The sleeves are constructed of sheet metal or other suitable material bent into the form shown in Fig. 7 of the drawing and consisting of a channel portion 42 which partially embraces the clamping bar 32 and a semi-tubular portion 43 which receives and conforms to the configuration of the coil spring. The sleeves are slidable on the clamping bars and by sliding them off the straight inner end portions of the clamping bars they are adapted to be turned to about right angles, thereby permitting the hooked end of the tension spring to be moved from one hole to another to provide the desired tension and to avoid over-stretching the spring and over-taxing the same when attaching the clamping bars to a large tire.

The spring extends through aligned openings 44 in the sides of a substantially U-shaped yoke 45 which is arranged on the rod 1 to provide a central guide and support for the coil spring.

The horizontal supporting bar 29 has mounted on its terminal portions spaced abutment arms 46 arranged to abut against the bead flange 47 of the rim of a tire at opposite sides of the center of the bottom thereof and spaced apart uniform distances from the central vertical transverse plane of the wheel and cooperating with an upper abutment arm 48 mounted on the upper portion of the rod 1 and located in said central plane of the wheel. The abutment arms preferably consist of pieces of round rod material cut to the proper length. Each of the lower abutment arms 46 has threaded ends 49 adjustably mounted in threaded openings 50 in the end portions of the supporting bar 29 and adapted to be adjusted inwardly and outwardly to position the central supporting rod 1 in a true vertical position or in true parallelism with the side of the wheel so that the scale plate and the supporting plate 21 will occupy a true horizontal position at the front face of the block 2. The lower abutment arms 46 are secured in their adjustment by lock or jam nuts 51 arranged on the threaded ends of the abutment arms and engaging the front face of the supporting bar 29, as clearly illustrated in Fig. 5 of the drawings. The engaging or abutting portions of the arms 46 are provided with sleeves 52 having lugs 53 located at the upper portions of the sleeves and projecting beyond the abutment arms 46 and arranged to rest upon the tire bead 47 of the rim to support the wheel gauge thereon. The centrally arranged upper abutment arm 48 is provided at its attached end with an opening 54 through which passes the rod 1 which is engaged by a thumb screw 55 mounted in a threaded opening 56 in the attached end of the abutment arm 48 and engaging the rod 1 which has a flat surface 57 cooperating with the thumb screw 55 in the adjustment of the central upper abutment arm 48 and in maintaining the same against rotary movement on the rod 1. The upper abutment arm 48 is adapted to be adjusted the required distance from the lower abutment arms for properly engaging the bead flange 47 of the rim at the top thereof.

The plumb bob pointer travels over a camber graduated scale 59 having a zero degree indication mark 60 midway of positive and negative zones 61 and 62 of said degree scale and when steering spindle bolt angle inclinations are tested it is possible to compare the distance and location of the plumb bob pointer travel of each of the two front wheels when the comparison test is made by the full limit of right and left steering movement of the steering wheel of the vehicle.

As will be understood, the coil tension spring 35 connected with the rod 1 through the yoke 45 on the rod, not only exerts inward pressure on the clamping bars 32 longitudinally thereof to yieldingly maintain the same with their clamping jaws or hooks in gripping engagement with the tread of the tire of a wheel, but also exerts lateral pressure on the rod 1 to maintain the upper abutment arm 48 and the lower abutment arms in engagement with the rim of a wheel, the lower abutment arms located at opposite sides of the rod 1 being held with their projecting lugs 53 bearing against the interior face of the rim of the wheel so that the gauge is positively maintained against radial movement relative to the wheel.

The camber degree graduations are actual degree spaced lines in relation to the radius of and from the plumb bob pointer's supporting axis. The degree graduations are not to be considered as actual degrees of caster or side inclination but in the present invention the camber degree graduations serve as caster compare lines termed as such for the reason that the wheel camber angle and the spindle bolt side inclination angle are in non-adjustable fixed relation to each other and any degree change made to camber occurs in the side inclination angle.

Steering pulls requiring tiresome effort of the vehicle driver to hold the vehicle in a desired steering course can be, and often are, caused by excessive degrees of camber in one of the front wheels and this condition usually can be quickly observed by noting how one or both of the front wheels tip inwardly or outwardly in respect to proper vertical. With a unit of this invention in testing engagement with each of the two front wheels, the camber degree of each wheel is tested and indicated when the two front wheels have been set to straight ahead steering position by turning the steering wheel to its straight ahead location.

The results of range and location of plumb bob pointer travel over the degree graduations occurring with the full right and left turning of the steering wheel are caused by the inclination angle of the spindle bolt for caster plus the inclination angle of the spindle bolt side inclination. The angles of aforesaid steering spindle bolts are engineered and set to provide assisting steering forces resulting from gravity attraction which assists in steering plus the assisting force derived from propelling motive power while the vehicle is being steered.

Caster inclination angle during spindle bolt inclination tests by the present invention can cause an unbelievable range of plumb bob pointer travel and this range of travel is considerably diminished or increased by slight changes in caster inclination angle. The plumb bob pointer may travel over positive and negative zones when caster inclination exists.

It is, therefore, evident that the camber degree graduation scale can properly be termed as caster compare lines. With zero wheel camber and zero caster the plumb bob pointer travel will be reduced to about 40 minutes of the first degree space on the positive zone side of zero camber line. This restricted plumb bob pointer travel, if the same in each steering wheel, indicates that the inclination angle of the steering spindle bolts designed to cause steering assisting forces are equal in inclination angle and equal in assisting steering forces, thus resulting in better quality steering and less required steering effort for the reason that the assisting steering force of each front wheel is in balanced opposition force to the other front wheel inclination angle and assisting steering force. The scale markings provide an O. K. zone located between the zero 60 and the first degree of the positive zone and for convenience the O. K. zone is divided into three equal spaces, as clearly illustrated in Fig. 6 of the drawing. The plumb bob pointer provides accurate means for supporting the plumb bob assembly in an accurate vertical condition. A spirit level is employed to accurately position the supporting bar 29 with relation to the block 2. Since the attraction of gravity actuates the plumb bob pointer it is of prime importance that the surface of the floor on which the vehicle is tested should be truly level, flat and smooth and such a floor is required for accurate correctional results. It is not necessary to remove any structural part of the wheels of running gear assembly nor is jacking up of the front wheels necessary.

When a unit of the present invention is applied to each of the front wheels the camber degree of each wheel is simultaneously tested when the two front wheels have been turned to straight ahead steering position. When the camber of the front wheels is to be tested by a single unit of the present invention, it is first applied to one wheel and then to the other and the scale is provided with markers 63 and 64 so that the position of the plumb bob pointer at the conclusion of the test of one wheel may be indicated by one of the markers 63 or 64 so that when transferring the wheel gauge from one front wheel to the other it is not necessary to remember the position of the plumb bob pointer in the first test and a second test may be made of the other front wheel and the position of the plumb bob pointer may be indicated by the other marker. In this manner the result of the tests may be readily noted at the conclusion of the two tests and a similar use of the markers may be had in testing for caster and side inclination. Each marker 63 or 64 may be constructed of wire or any other suitable material and it consists of a body portion 65, a head 66 and an indicating arm 67. The head and indicating arm are bent around the side edges of the supporting plate 21 and the scale plate 16 and the head extends over the supporting plate at one side edge thereof and terminates short of the scale plate while indicating arm 67 is extended over one side portion of the scale plate and terminates adjacent the markings thereof. The markers are slidably mounted on the supporting plate and are adjustable longitudinally thereof to position them adjacent any of the markings of the scale plate.

When a car wheel to which the wheel gauge is applied is turned to the limit of a right hand turn, the upper portion of the vertical rod is tipped forward, but the plumb bob pointer is not affected by this tilting so far as getting away from straight line travel over the degree scale is concerned. When the car wheel is turned to its limit to the left steering position, the upper portion of the vertical rod tilts to the rear of the car without disturbing the straight travel of the plumb bob pointer over the degree scale. By adjusting the camber angle and the caster angle so that the plumb bob pointer will be at zero with normal car load and the plumb bob pointer travel is confined to the O. K. zone, in the test of both wheels, then the assisting steering forces are in a state of angle balance that minimizes steering pull. Abnormal steering pull is due to wheel misalignment. It has been found that even a slightly excess toe-in or toe-out will also be a cause for needless pull to the right. If caster angles of both wheels be equal and the camber of one wheel be zero, then if the camber of the other wheel, for example, the right front wheel, be 2° positive camber, this condition alone will cause hard pull to the right. If the camber degree of the same wheel should be 2° negative, then the steering pull will be to the left when the vehicle is driven over a level surface.

A fiber spacer 68 is preferably interposed between the horizontal supporting bar 29 and the rear face of the block 2.

It will be seen that the wheel gauge is adapted to be readily clamped to the sides of wheels of different diameters and that the clamping devices are associated with means for centering the wheel gauge on the rim of a wheel and for enabling the vertical support to be adjusted to a true vertical position in true parallelism with the side of the wheel with the plumb bob pointer in position to swing inwardly and outwardly in the central vertical transverse plane of the axis of the wheel.

I claim:

1. A wheel gauge comprising a central vertical support, an arm extending outwardly from the upper portion of the support, a scale extending outwardly from the lower portion of the support, a plumb bob pointer pivotally connected to and hung from said arm and arranged for movement over said scale toward and from the vertical support, horizontal clamping bars extending from opposite sides of the vertical support and having substantially hook-shaped outer ends for engaging the tire of a wheel at the front and rear thereof, and resilient means providing the sole connection between the clamping bars and exerting inward pressure thereon longitudinally thereof for maintaining the same in clamping engagement with the tire of the wheel and for holding the support against the wheel.

2. A wheel gauge comprising a central vertical support, an arm extending outwardly from the upper portion of the support, a scale extending outwardly from the lower portion of the support, a plumb bob pointer pivotally connected to and hung from said arm and arranged for movement over said scale toward and from the vertical support, horizontal clamping bars extending from opposite sides of the vertical support and having substantially hook-shaped outer ends for engaging the tire of a wheel at the front and rear thereof, and a coil spring extending longitudinally of the clamping bars and connected at its outer ends with the same for maintaining the clamping bars in engagement with the wheel, and means located between the ends of the spring and carried by the clamping bars for slidably supporting the spring.

3. A wheel gauge comprising a central vertical support, an arm extending outwardly from the upper portion of the support, a scale extending outwardly from the lower portion of the support, a plumb bob pointer pivotally connected to and hung from said arm and arranged for movement over said scale toward and from the vertical support, horizontal clamping bars extending from opposite sides of the support and provided at their outer ends with means for engaging the wheel, and the clamping bars each having spaced perforations intermediately of the ends of the same, a coil spring extending longitudinally of the clamping bars and having hook-shaped terminals engaging some of said perforations of the clamping bars, the sleeves arranged on the clamping bars and having portions slidably receiving the spring between the ends thereof.

4. A wheel gauge comprising a central vertical support, an arm extending outwardly from the upper portion of the support, a scale extending outwardly from the lower portion of the support, a plumb bob pointer pivotally connected to and hung from said arm and arranged for movement over said scale toward and from the vertical support, horizontal clamping bars extending from opposite sides of the support and provided at their outer ends with means for engaging the wheel, and the clamping bars each having spaced perforations intermediately of the ends of the same, a coil spring extending longitudinally of the clamping bars and having hook-shaped terminals engaging some of said perforations of the clamping bars, sleeves arranged on the clamping bars and having portions slidably receiving the spring between the ends thereof, and a central yoke arranged on the vertical support and having spaced sides provided with aligned openings receiving and supporting the central portion of the coil spring.

5. A wheel gauge comprising a central vertical support composed of a lower block having vertical faces and provided with a threaded vertical socket extending downwardly from the upper end of the block, and a single vertical rod having a lower threaded portion engaged with the threads of said socket for rotary and vertical adjustment of the rod relative to said block, a jam nut arranged on the threaded portion of the rod and engaging the upper end of the block, a scale extending forwardly from the front face of the block, an arm extending forwardly from the upper portion of the rod, and a plumb bob pointer pivotally hung from the outer portion of said arm and arranged to only swing inwardly and outwardly in a vertical plane over said scale toward and from the wheel.

6. A wheel gauge comprising a vertical support provided at its lower end with a block having vertical faces, a horizontal scale supporting plate extending forwardly from the front face of the block and provided at its inner end and outer ends with upwardly extending flanges, the flange at the inner end of the plate being secured to said block, a graduated scale carried by said plate, an arm extending forwardly from the upper portion of the vertical support and a plumb bob pointer pivotally suspended from the outer portion of the arm for movement toward and from the support and having its lower end movable over said graduated scale and limited in its outward movement by the outer flange of said plate, and means for mounting the wheel gauge on a wheel at the outer side thereof.

7. A wheel gauge comprising a vertical support provided at its lower end with a block having vertical faces, a horizontal scale supporting plate extending forwardly from the front face of the block and provided at its inner and outer ends with upwardly extending flanges, the flange at the inner end of the plate being secured to said block, a scale consisting of a graduated plate arranged upon the supporting plate and provided with slots, fastening means mounted on the supporting plate and operating in the slots for adjustably securing the scale plate to the supporting plate, an arm extending forwardly from the upper portion of the vertical support, and a plumb bob pointer pivotally suspended from the outer portion of the arm for swinging movement toward and from the support and having its lower end movable over said scale plate, and means for mounting the wheel gauge on a wheel at the outer side thereof.

8. A wheel gauge comprising a central vertical support having a block at its lower portion provided with vertical front and rear faces, a scale supporting plate extending forwardly from the front face of the block and having a flange fitted against the same, an elongated scale plate fixedly secured on the upper face of the supporting plate, an arm extending forwardly from the upper portion of the vertical support, a plumb bob pointer pivotally hung from said arm for swinging movement toward and from the vertical support and having its lower end movable over the scale supporting plate, and means for securing the wheel gauge to a wheel at the outer side thereof including a horizontal supporting bar fitted against the rear face of said block and extending from opposite sides thereof, a fastening device piercing said block and securing the supporting bar and the flange of the scale supporting plate to the same, and lower abutment arms carried by the end portions of the supporting bar and arranged to engage a wheel at opposite sides of the center of the bottom thereof.

9. A wheel gauge comprising a central vertical support, an arm extending outwardly from the upper portion of the support, a scale extending outwardly from the lower portion of the support, a plumb bob pointer pivotally connected to and hung from said arm for movement in a vertical plane over said scale toward and from the vertical support, upper and lower abutment arms carried by the vertical support and projecting rearwardly therefrom and arranged to position the wheel gauge on the wheel with the pumb bob pointer arranged to swing in the central vertical transverse plane of the axis of the wheel, clamping bars extending from opposite sides of the vertical support intermediate the ends thereof at substantially a right angle thereto between the upper and lower abutment arms and having substantially hook shaped outer ends for gripping the tire of a wheel at opposite points at the front and rear thereof, and resilient means providing the sole connection between the clamping bars and exerting inward pressure thereon longitudinally thereof for maintaining the same in gripping engagement with the tire of a wheel and for holding the support against the wheel.

10. A wheel gauge comprising a central vertical support, an arm extending outwardly from the upper portion of the support, a scale extending outwardly from the lower portion of the support, a plumb bob pointer pivotally connected to and hung from said arm for movement in a vertical plane over said scale toward and from the vertical support, an upper abutment arm extending rearwardly from the vertical support and arranged to abut the rim of a wheel centrally of the upper portion thereof, and a pair of lower horizontally spaced abutment arms carried by the lower portion of the vertical support and arranged to engage the wheel at opposite sides of said support, clamping bars extending from opposite sides of the vertical support intermediate the ends thereof at substantially a right angle thereto between the upper abutment arm and the pair of lower abutment arms, said clamping bars having substantially hook shaped outer ends for gripping the tread of the tire of a wheel at opposite points at the front and rear thereof, and resilient means providing the sole connection between the clamping bars and exerting inward pressure thereon longitudinally thereof for maintaining the same in gripping engagement with the tire of a wheel and for holding the support against the wheel.

11. A wheel gauge comprising a central vertical support, an arm extending outwardly from the upper portion of the support, a scale extending outwardly from the lower portion of the support, a plumb bob pointed pivotally connected to and hung from said arm for movement in a vertical plane over said scale toward and from the vertical support, clamping means extending from opposite sides of the support at substantially a right angle thereto for engaging the tire of a wheel at opposite points at the front and rear thereof for securing the gauge to the wheel at the outer side thereof, said clamping means having spring means longitudinally resilient for holding the clamping means in their clamping relationship, a pair of lower horizontally spaced abutment arms extending rearwardly from the vertical support disposed to abut the rim of the wheel at opposite sides of the vertical support, each of said abutment arms being provided with a projecting lug at its inner end to fit over and bear against the interior face of the rim for supporting the wheel gauge, said spring means also being flexible laterally to exert lateral pressure inwardly upon the vertical support to maintain the lugs on the abutment arms in engagement with the interior face of the rim, whereby the abutment arms are held against displacement radially relative to the wheel.

12. A wheel gauge comprising a central vertical support, an arm extending outwardly from the upper portion of the support, a scale extending outwardly from the lower portion of the support, a plumb bob pointer pivotally connected to and hung from said arm for movement in a vertical plane over said scale toward and from the vertical support, clamping means extending from opposite sides of the vertical support and at substantially a right angle thereto for engaging the tire of a wheel at opposite points at the front and rear thereof for securing the gauge to the wheel at the outer side thereof, said clamping means having spring means longitudinally resilient for holding the clamping means in their clamping relationship, an upper abutment arm extending rearwardly from the vertical support and arranged to abut the rim of the wheel centrally of the upper portion thereof, and a pair of lower horizontally spaced abutment arms carried by the lower portion of the vertical support and arranged to engage the rim of the wheel at opposite sides of the support, each of said lower spaced abutment arms being provided with a projecting lug at its inner end to fit over and bear against the interior face of the rim of the wheel for supporting the wheel gauge, said clamping means also being flexible laterally and when engaged with the tire of a wheel acting to exert lateral pressure inwardly upon said vertical support to maintain the abutment arms pressed inwardly against the rim of the wheel, and with the projecting lugs of the lower abutment arms fitting against the interior face of the rim, whereby the abutment arms are held against displacement radially relative to the wheel.

13. A wheel gauge comprising a central vertical support, an arm extending outwardly from the upper portion of the support, a scale extending outwardly from the lower portion of the support, a plumb bob pointer pivotally connected to and hung from said arm for movement in a vertical plane over said scale toward and from the vertical support, a pair of lower horizontally spaced abutment arms extending rearwardly from the vertical support and arranged to engage the rim of a wheel at opposite sides of the vertical support, each of said spaced abutment arms being provided with a projecting lug at its inner end to fit over and bear against the interior face of the rim of the wheel for supporting the wheel gauge, clamping bars extending from opposite sides of the vertical support at substantially a right angle thereto and having hook shaped ends for gripping the tread of the tire of a wheel at the front and rear thereof, a coil tension spring extending longitudinally of the clamping bars and connected at its outer ends with the same for exerting inward pressure thereon longitudinally thereof for maintaining the same with their hook shaped ends in gripping engagement with the tread of the tire of a wheel, and said coil spring being laterally flexible and connected with said support to exert inward pressure on the support and yieldably maintain the lugs on the abutment arms in engagement with the interior face of the rim, whereby the abutment arms are held against displacement radially relative to the wheel.

GEORGE H. TABER.

REFERENCES CITED

The following references are of record in the file of this patent:

UNITED STATES PATENTS

| Number | Name | Date |
|---|---|---|
| 662,991 | Van Luvan | Dec. 4, 1900 |
| 1,707,593 | Arbuckle | Apr. 2, 1929 |
| 1,980,487 | Klauder | Nov. 13, 1934 |
| 1,985,330 | Starr | Dec. 25, 1934 |
| 2,000,865 | Seger et al. | May 7, 1935 |
| 2,020,134 | Bryant | Nov. 5, 1935 |
| 2,046,528 | Morse et al. | July 7, 1936 |
| 2,069,249 | Hunt | Feb. 2, 1937 |
| 2,423,317 | Holton | July 1, 1947 |
| 2,470,090 | Carrigan et al. | May 17, 1949 |
| 2,475,502 | Holmes | July 5, 1949 |
| 2,501,033 | Denison | Mar. 21, 1950 |
| 2,554,621 | Jocobsen et al. | May 29, 1951 |
| 2,569,416 | Jacobsen | Sept. 25, 1951 |
| 2,581,630 | Carrigan | Jan. 8, 1952 |

FOREIGN PATENTS

| Number | Country | Date |
|---|---|---|
| 521,616 | Great Britain | May 27, 1940 |
| 738,404 | France | Oct. 17, 1932 |

OTHER REFERENCES

Publ.: Browne, "Indicator Gage etc.," American Machinist Magazine, Oct. 11, 1945, page 136.